(12) United States Patent
Sakamoto et al.

(10) Patent No.: US 9,528,027 B2
(45) Date of Patent: Dec. 27, 2016

(54) COATING FOR PREVENTING SCATTERING OF FRAGMENTS

(71) Applicant: Panasonic Intellectual Property Management Co., Ltd., Osaka (JP)

(72) Inventors: Kenji Sakamoto, Osaka (JP); Koichi Sayo, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/759,809

(22) PCT Filed: Feb. 20, 2014

(86) PCT No.: PCT/JP2014/000874
§ 371 (c)(1),
(2) Date: Jul. 8, 2015

(87) PCT Pub. No.: WO2014/141596
PCT Pub. Date: Sep. 18, 2014

(65) Prior Publication Data
US 2015/0337169 A1    Nov. 26, 2015

(30) Foreign Application Priority Data

Mar. 11, 2013  (JP) ................................. 2013-048469

(51) Int. Cl.
*C09D 183/04* (2006.01)
*C09D 7/12* (2006.01)

(52) U.S. Cl.
CPC .............. *C09D 183/04* (2013.01); *C09D 7/12* (2013.01)

(58) Field of Classification Search
None
See application file for complete search history.

(56) References Cited

U.S. PATENT DOCUMENTS

| 4,558,109 A | * | 12/1985 | McAfee | C08L 83/04 524/862 |
| 4,737,562 A | * | 4/1988 | Chaudhury | C08K 5/54 528/14 |
| 4,921,880 A | * | 5/1990 | Lee | C08K 5/5415 522/12 |
| 5,364,921 A | * | 11/1994 | Gray | C08L 83/04 156/307.1 |
| 5,595,826 A | * | 1/1997 | Gray | C04B 41/4961 428/447 |
| 5,882,467 A | * | 3/1999 | Sierawski | C08K 3/22 106/18.26 |
| 6,485,838 B1 | | 11/2002 | Shimada et al. | |
| 6,512,037 B1 | * | 1/2003 | Ahn | C08K 5/0091 524/413 |
| 6,586,551 B2 | * | 7/2003 | Bohin | B60R 21/235 528/15 |
| 6,750,550 B1 | * | 6/2004 | Yamakawa | C08G 59/306 257/783 |
| 7,588,967 B2 | * | 9/2009 | Kashiwagi | C08L 83/04 438/127 |
| 7,611,998 B2 | * | 11/2009 | Jackson | B32B 5/26 427/412 |
| 7,641,980 B2 | * | 1/2010 | Ikeno | C08L 83/04 428/447 |
| 7,973,108 B2 | * | 7/2011 | Okamoto | C08G 65/336 525/475 |
| 8,088,869 B2 | * | 1/2012 | Joseph | C09D 183/04 525/479 |
| 2007/0026244 A1 | * | 2/2007 | Budden | C08L 83/04 428/447 |
| 2009/0065792 A1 | * | 3/2009 | Thompson | H01L 33/54 257/98 |
| 2010/0148378 A1 | * | 6/2010 | Katayama | B29D 11/00365 257/791 |
| 2011/0269918 A1 | * | 11/2011 | Hamamoto | H01L 33/56 525/478 |

FOREIGN PATENT DOCUMENTS

| JP | 09-268261 A | 10/1997 |
| JP | 2000-328001 A | 11/2000 |
| JP | 2010-248468 A | 11/2010 |

OTHER PUBLICATIONS

International Search Report for corresponding International Application No. PCT/JP2014/000874 mailed May 13, 2014.

\* cited by examiner

*Primary Examiner* — Robert S Loewe
(74) *Attorney, Agent, or Firm* — Renner, Otto, Boisselle & Sklar, LLP

(57) ABSTRACT

Provided is a coating for preventing scattering of fragments, the coating containing, as main components, (A) a polysiloxane having at least two vinyl groups or (meth)acryloyl groups each bonded to a silicon atom, (B) a polysiloxane having at least two hydrogen groups each bonded to a silicon atom, (C) an addition reaction-accelerating catalyst, (D) an alkoxy oligomer, and (E) an organometallic catalyst containing at least one metal selected from zirconium, zinc, and magnesium.

6 Claims, No Drawings

COATING FOR PREVENTING SCATTERING OF FRAGMENTS

TECHNICAL FIELD

The present invention relates to a coating for preventing scattering of fragments.

BACKGROUND ART

When glass products such as a window, a bulb, a bulb cover, lightening equipment, and an experimental flask, ceramics, ceramic products other than ceramics, and the like (these being abbreviated as "inorganic material products") are collided with another object or are broken due to self-destruction, fragments thereof may be scattered. Conventionally, in order to suppress scattering of fragments, a technique has been performed in which a coating containing, as main components, a fluorine resin (PFA resin), a silicone resin, a urethane resin, a polyester resin, a vinyl chloride resin, and the like has been applied to an inner surface or an outer surface of the inorganic material product. Among them, a coating containing a PFA resin as a main component has been more preferably used from the viewpoint of shatterproof property, heat resistance and light resistance for a long period of time. However, an inorganic material product to which the coating containing a PFA resin as a main component is applied does not have sufficient transparency and has a problem in that the appearance thereof is deteriorated.

A coating for preventing scattering of fragments, which contains an addition reaction type silicone resin as a main component, is proposed in order to achieve the balance between such shatterproof property, heat resistance and light resistance for a long period of time, and transparency of appearance of the product (Patent Literature 1).

The coating for preventing scattering of fragments described in Patent Literature 1 contains, as main components, (A) a polysiloxane resin containing two or more vinyl groups in a molecule, (B) a hydrogen polysiloxane resin containing two or more SiH bonds in a molecule, (C) a catalyst containing a Group 8 metal in the periodic table, and (D) a silane coupling agent represented by the formula: $R_3$SiR'X, $R_3$ SiX [in the formula, all or a part of R groups are each a 1-5C alkoxy group, and the remaining of R groups are each a 1-5C alkyl group; R' is a 1-5C alkylene group; X is a glycidyl ether group, a (meth)acrylic ester group, a vinyl group, a halogen element, or —SH].

CITATION LIST

Patent Literature

Patent Literature 1: JP 1997-268261 A

SUMMARY OF INVENTION

Technical Problem

However, although the coating for preventing scattering of fragments described in Patent Literature 1 is excellent in the transparency of the coated inorganic material product, the linking density of the resin is low and the product has surface tackiness. Therefore, dust or grit is attached to the coated surface when the product is exposed to the outside for a long time of period and thus there is a case where the antifouling property is not necessarily high.

The invention was made in consideration of the circumstances as described above, and an object thereof is to provide a coating for preventing scattering of fragments capable of achieving the balance between excellent transparency and antifouling property of the coated surface of the inorganic material product as well as suppressing scattering of fragments of the inorganic material product when the inorganic material product is broken.

Solution to Problem

The present inventors conducted intensive studies in order to solve the problem described above, and as a result, they found that an alkoxy oligomer and an organometallic catalyst are oriented to the surface of the silicone resin at the time of condensation reaction by coexisting the alkoxy oligomer and the organometallic catalyst in the addition reaction type silicone resin. In addition, they found that the surface tackiness of the coated surface was improved without the transparency of the inorganic material product to which a silicone resin was applied being deteriorated due to this orientation.

Further, the present inventors found that a decrease in the rubber elasticity of the silicone resin, which is concerned by coexisting the alkoxy oligomer and the organometallic catalyst, did not occur; on the contrary hand, the tearing strength of the silicone resin was improved and fragment scattering prevention performance was improved.

A coating for preventing scattering of fragments of the invention is characterized by containing, as main components, (A) a polysiloxane having at least two vinyl groups or (meth)acryloyl groups each bonded to a silicon atom, (B) a polysiloxane having at least two hydrogen groups each bonded to a silicon atom, (C) an addition reaction-accelerating catalyst, (D) an alkoxy oligomer, and (E) an organometallic catalyst containing at least one metal selected from zirconium, zinc, and magnesium.

In the coating for preventing scattering of fragments, it is preferable that the addition reaction-accelerating catalyst (C) be a hydrocarbon complex, alcoholate, chloride, or at least one simple metal selected from platinum (inclusive of platinum black), rhodium, and palladium. Further, it is preferable that the organometallic catalyst (E) be a chelate or salt of at least one metal selected from zirconium, zinc, and magnesium.

Further, in the coating for preventing scattering of fragments, it is preferable that the alkoxy oligomer (D) be a dimer of a silane compound and be contained in 10 parts by mass to 100 parts by mass with respect to 100 parts by mass of the polysiloxane (A) having at least two vinyl groups or (meth)acryloyl groups each bonded to a silicon atom.

Advantageous Effects of Invention

According to the coating for preventing scattering of fragments of the invention, it is possible to achieve the balance between excellent transparency and antifouling property of the coated surface of the inorganic material product as well as to suppress scattering of fragments of the inorganic material product when the inorganic material product is broken.

DESCRIPTION OF EMBODIMENTS

Hereinafter, the coating for preventing scattering of fragments of the invention will be described in detail.

The coating for preventing scattering of fragments contains, as main components, (A) a polysiloxane having at least two vinyl groups or (meth)acryloyl groups each bonded to a silicon atom (hereinafter, referred to as a polysiloxane resin (A)), (B) a polysiloxane having at least two hydrogen groups each bonded to a silicon atom (hereinafter, referred to as a polysiloxane cross linking agent (B)), (C) an addition reaction-accelerating catalyst, (D) an alkoxy oligomer, and (E) an organometallic catalyst containing at least one metal selected from zirconium, zinc, and magnesium.

The polysiloxane resin (A) has at least two vinyl groups or (meth)acryloyl groups each bonded to a silicon atom in a molecule, and is not particularly limited as long as it is organopolysiloxane having a polysiloxane structure as a main chain. Examples of the main chain include polydimethylsiloxane, methylphenylsiloxane, and diphenylsiloxane. Among these, polydimethylsiloxane is preferable from the viewpoint of excellent heat resistance and light resistance.

The molecular structure of the polysiloxane resin (A) is not particularly limited. For example, a straight-chain, partially branched straight-chain, cyclic, branched-chain, three-dimensional network structure and the like are exemplified. Among these, a straight-chain polysiloxane is exemplified as one of preferred forms.

As one of preferred forms of the polysiloxane resin (A), a case where the polysiloxane resin (A) has, as a molecular structure, a main chain composed of repetitions of a diorganosiloxane unit. Further, the molecular terminal of the polysiloxane is ended with a silanol group (a hydroxyl group bonded to a silicon atom) or an alkoxysilyl group, but can be blocked with a triorganosiloxy group such as a trimethylsiloxy group.

The polysiloxane resin (A) preferably has two or more vinyl groups or (meth)acryloyl groups each bonded to a silicon atom in a molecule, and for example, more preferably has 2 to 20 vinyl groups or (meth)acryloyl groups, and still more preferably has 2 to 10 vinyl groups or (meth)acryloyl groups.

When the number of vinyl groups or (meth)acryloyl groups each bonded to a silicon atom in a molecule is within the above range, it is possible to obtain a coating for preventing scattering of fragments with excellent toughness and stretchability.

Further, a vinyl group is more preferable than a (meth)acryloyl group in consideration of curability.

As a bonding position of a vinyl group or a (meth)acryloyl group, for example, either or both of a molecular chain terminal and a side molecular chain of polysiloxane are exemplified.

Further, a vinyl group or a (meth)acryloyl group can be bonded to one or both terminals of the molecular chain of the polysiloxane resin (A).

Examples of an organic group, which may be bonded to a silicon atom, of the polysiloxane resin (A), in addition to a vinyl group or (meth)acryloyl group, include alkyl groups such as a methyl group, an ethyl group, a propyl group, a butyl group, a pentyl group, a hexyl group, and a heptyl group. Further, aryl groups and the like such as a phenyl group, a tolyl group, a xylyl group, and a naphthyl group are exemplified. Furthermore, aralkyl groups such as a benzyl group and a phenethyl group; and halogenated alkyl groups such as a chloromethyl group, a 3-chloropropyl group, and a 3,3,3-trifluoropropyl group are exemplified. Among these, a methyl group or a phenyl group is preferable in consideration of heat resistance. These can be used alone or as a mixture of two or more thereof.

The molecular weight (mass average molecular weight) of the polysiloxane resin (A) is 500 to 100,000, and for example, is preferably in a range of from 1,000 to 100,000, and more preferably in a range of from 5,000 to 50,000.

When the molecular weight of the polysiloxane resin (A) is within the above range, it is possible to obtain a coating for preventing scattering of fragments which is capable of further reducing the surface tack and is excellent in toughness, stretchability, and workability.

Incidentally, the mass average molecular weight is a polystyrene equivalent value measured by gel permeation chromatography (GPC).

The viscosity of the polysiloxane resin (A) is, for example, preferably in a range of from 5 mP·s to 10,000 mPa·s, and more preferably in a range of from 10 mP·s to 1,000 mPa·s.

When the viscosity of the polysiloxane resin (A) is within the above range, the handling property of the coating for preventing scattering of fragments to be obtained is improved.

Incidentally, the viscosity is measured under the condition at 25° C. by a B-type viscometer.

The polysiloxane cross linking agent (B) has at least two SiH groups that are hydrogen groups each bonded to a silicon atom in a molecule, and is not particularly limited as long as it is organohydrogenpolysiloxane having a polysiloxane structure as a main chain.

The polysiloxane cross linking agent (B) preferably has 2 to 300 hydrogen groups each bonded to a silicon atom in a molecule, and for example, is more preferably in a range of from 3 to 150 hydrogen groups.

The molecular structure of the polysiloxane cross linking agent (B) is not particularly limited. For example, a straight-chain, partially branched straight-chain, cyclic, branched-chain, three-dimensional network structure, and the like are exemplified.

In the polysiloxane cross linking agent (B), as a bonding position of hydrogen bonded to a silicon atom, for example, either or both of a molecular chain terminal and a side molecular chain of polysiloxane are exemplified. Further, the hydrogen group bonded to a silicon atom can be bonded to one or both terminals of the molecular chain of the polysiloxane.

Examples of the polysiloxane cross linking agent (B) include methylhydrogenpolysiloxanes blocked at both molecular terminals with trimethylsiloxy groups, copolymers of dimethylsiloxane blocked at both molecular terminals with trimethylsiloxy groups and methylhydrogensiloxane, methylhydrogenpolysiloxanes blocked at both molecular terminals with silanol groups, copolymers of dimethylsiloxane blocked at both molecular terminals with silanol groups and methylhydrogensiloxane, dimethylpolysiloxanes blocked at both molecular terminals with dimethylhydrogensiloxy groups, methylhydrogenpolysiloxanes blocked at both molecular terminals with dimethylhydrogensiloxy groups, and copolymers of dimethylsiloxane blocked at both molecular terminals with dimethylhydrogensiloxy groups and methylhydrogensiloxane. Further, compounds in which a part or the whole of methyl groups in these compounds are substituted with other alkyl groups such as an ethyl group and a propyl group, or a phenyl group are also exemplified. These compounds can be used alone or as a mixture of two or more thereof.

The hydrogen atom bonded to a silicon atom of the polysiloxane cross linking agent (B) is included, for example, preferably in a range of from 0.1 mol to 5 mol, more preferably in a range of from 0.5 mol to 2.5 mol, and still more preferably in a range of from 1.0 mol to 2.0 mol per 1 mol of the alkenyl group in the polysiloxane.

When the hydrogen atom bonded to a silicon atom of the polysiloxane cross linking agent (B) is included in the above range, strength, toughness, stretchability, brittleness, and the like of the coating for preventing scattering of fragments after curing are improved.

The polysiloxane resin (A) and the polysiloxane cross linking agent (B) described above can be used as a product obtained by mixing them in advance.

The addition reaction-accelerating catalyst (C) is a catalyst used for accelerating the addition reaction of a vinyl group or a (meth)acryloyl group of the polysiloxane resin (A) with a SiH group, which is a hydrogen atom bonded to a silicon atom, of the polysiloxane cross linking agent (B).

Examples of the addition reaction-accelerating catalyst (C) include platinum group metals alone such as platinum (inclusive of platinum black), rhodium, and palladium; platinum chloride, chloroplatinic acid, and chloroplatinic acid salts such as $H_2PtCl_4 \cdot nH_2O$, $H_2PtCl_6 \cdot nH_2O$, $NaHPtCl_6 \cdot nH_2O$, $KHPtCl_6 \cdot nH_2O$, $Na_2PtCl_6 \cdot nH_2O$, $K_2PtCl_4 \cdot nH_2O$, $PtCl_4 \cdot nH_2O$, $PtCl_2$, and $Na_2HPtCl_4 \cdot nH_2O$ (provided that, in the formula, n is an integer of 0 to 6, and is preferably 0 or 6), alcohol-modified chloroplatinic acid; complexes of chloroplatinic acid with olefines; platinum group metals such as platinum black and palladium supported on carriers such as alumina, silica, and carbon; rhodium-olefin complexes; chlorotris(triphenylphosphine)rhodium (Wilkinson catalyst); and complexes of platinum chloride, chloroplatinic acid or chloroplatinic acid salts with vinyl group-containing siloxanes. Among these, platinum group metal based catalysts such as complexes with a vinyl group-containing cyclic siloxane is preferably used.

The addition reaction-accelerating catalyst (C) is, for example, contained in a range of from 0.1 ppm to 500 ppm with respect to the total amount of the polysiloxane resin (A) and the polysiloxane cross linking agent (B) in the terms of mass.

The alkoxy oligomer (D) has a function of reducing the surface tack of the polysiloxane resin (A) in such a manner that the alkoxy oligomer (D) is oriented to the surface of the polysiloxane resin (A) during curing the coating for preventing scattering of fragments and is subjected to condensation reaction in the presence of the organometallic catalyst (E).

The alkoxy oligomer (D) is not particularly limited as long as it is a compound which is blocked at the molecular terminal with at least an alkoxysilyl group represented by Si-OR (in the formula, R represents an alkyl group) and has a relatively low molecular weight. More specifically, a silicone resin, which is obtained by allowing alkoxysilane having an organic substituent to be subjected to hydrolytic condensation and blocked at both terminals with an alkoxysilyl group, and has a molecular weight (mass average molecular weight) of 200 to 10,000, is exemplified.

The alkoxy oligomer (D) is preferably a dimer of a silane compound, and according to this, compatibility with the polysiloxane resin (A) is improved.

Incidentally, examples of the alkyl group in the above formula include a methyl group, an ethyl group, a propyl group, an isopropyl group, a butyl group, a hexyl group, a phenyl group, and a cyclohexyl group. Among these, a methyl group is preferable.

In consideration of the strength of a cured product, the content of the alkoxy group in the alkoxy oligomer (D) is preferably in a range of from 12% by mass to 45% by mass. The content of the alkoxy group indicates a molecular weight ratio of the alkoxy group to the alkoxy oligomer (D).

Examples of commercially available products of the alkoxy oligomer (D) include X-40-9225 (produced by Shin-Etsu Chemical Co., Ltd.) and X-40-9246 (produced by Shin-Etsu Chemical Co., Ltd.). These can be used alone or as a mixture of two or more thereof.

The content of the alkoxy oligomer (D) in the coating for preventing scattering of fragments is, with respect to 100 parts by mass of the polysiloxane resin (A), in a range of from 10 parts by mass to 100 parts by mass, and for example, is preferably from 20 parts by mass to 80 parts by mass.

When the content of the alkoxy oligomer (D) in the coating for preventing scattering of fragments is within the above range, the surface tack of the coating for preventing scattering of fragments is reduced and the antifouling property is improved.

The organometallic catalyst (E) has a function of reducing the surface tack of the coating for preventing scattering of fragments by accelerating the condensation reaction of the alkoxy oligomer (D) oriented to the surface of the polysiloxane resin (A) during curing the coating for preventing scattering of fragments.

The organometallic catalyst (E) contains at least one metal selected from zirconium, zinc, and magnesium compounds. Among these, zirconium and zinc are preferably used. According to this, it is possible to expect that compatibility with the polysiloxane resin (A) is improved, that the addition reaction is not interfered, and that the surface tackiness of the coating for preventing scattering of fragments after curing is improved.

Examples of an organic group forming the organometallic catalyst (E) include a hydrocarbon group having a hetero atom such as an oxygen atom, a nitrogen atom, and a sulfur atom.

Examples of the hydrocarbon group include alkyl groups such as a methyl group, an ethyl group, a propyl group, an isopropyl group, a butyl group, a pentyl group, a hexyl group, a heptyl group, an octyl group, a 2-ethylhexyl group, a nonyl group, and a decyl group. Further, aryl groups and the like such as a phenyl group and a p-methylphenyl group are exemplified.

Further, examples of the organic group include alkoxy groups such as a methoxy group, an ethoxy group, and an isopropoxy group. In addition, aryloxy groups and the like such as a phenoxy group and a p-methylphenoxy group are exemplified. Moreover, acyloxy groups and the like such as an acetoxy group, a propionyloxy group, an isopropionyloxy group, a butylonyloxy group, an octylonyloxy group, a 2-ethylhexylonyloxy group, and a stearoyloxy group are exemplified. Furthermore, acyl groups and the like such as an acetyl group, a propionyl group, an isopropionyl group, a butylonyl group, an octylonyl group, a 2-ethylhexylonyl group, and a stearoyl group are exemplified. Among these, in consideration of the surface tackiness, an octylonyloxy group, a 2-ethylhexylonyloxy group, an acetylacetonate are preferably used, and thus the surface tackiness of the coating for preventing scattering of fragments after curing is reduced and the antifouling property is improved. These organic groups can be used alone or as a mixture of two or more thereof.

As a form of the organometallic catalyst (E), for example, a chelate, a salt, and the like are exemplified.

When the organometallic catalyst (E) is a chelate, as an organic group, for example, organic ligands such as a β-diketone compound and o-hydroxyketone compound are exemplified. Acetylacetonato and ethylacetylacetonato are preferably used.

When the organometallic catalyst (E) is a salt, the salt is not particularly limited as long as it is a carboxylic salt, and examples thereof include aliphatic carboxylic salts, alicyclic carboxylic salts, and aromatic carboxylic salts.

When a metal contained in the organometallic catalyst (E) is zirconium, for example, zirconiumchelates such as zirconium acetylacetonato [Zr(acac)$_2$] are exemplified. Further, carboxylic salts such as bis(2-ethylhexanoic acid)zirconyl, zirconyl octylate, and zirconyl naphthenate are exemplified.

When a metal contained in the organometallic catalyst (E) is zinc, for example, zinc chelates such as zinc(II)acetylacetonato [Zn(acac)$_2$] and bis(2,2,2,6-tetramethyl-3,5-heptanedione)zinc are exemplified. Further, carboxylic salts such as zinc octylate, neodecane zinc, zinc laurate, zinc stearate, zinc naphthenate, zinc benzoate, and p-tert-butyl zinc benzoate are exemplified.

When a metal contained in the organometallic catalyst (E) is magnesium, for example, chelates such as magnesium acetylacetonato are exemplified. Further, carboxylic salts such as magnesium octylate, magnesium laurate, and magnesium naphthenate are exemplified.

These organometallic catalysts (E) can be used alone or as a mixture of two or more thereof.

The organometallic catalyst (E) is, for example, contained in a range of from 0.1 parts by mass to 50 parts by mass with respect to the total amount 100 parts by mass of the polysiloxane resin (A) and the polysiloxane cross linking agent (B).

When the content of the organometallic catalyst (E) is within the above range, compatibility with the polysiloxane resin (A) is improved or the antifouling property is improved by reducing the surface tack of the coating for preventing scattering of fragments.

In such a coating for preventing scattering of fragments, additives can be added as necessary, in addition to the polysiloxane resin (A), the polysiloxane cross linking agent (B), the addition reaction-accelerating catalyst (C), the alkoxy oligomer (D), and the organometallic catalyst (E).

The additives are not particularly limited as long as they do not impair the objective or effect of the invention, and examples thereof include inorganic fillers, antioxidants, lubricants, UV absorbing agents, heat/light stabilizers, dispersing agents, antistatic agents, polymerization inhibitors, anti-foaming agents, curing accelerators, organic solvents, and inorganic phosphors. Further, antiaging agents, radical inhibitors, adhesive strength enhancers, flame retardants, surfactants, storage stability enhancers, ozone antiaging agents, thickening agents, plasticizers, radiation blocking agents, nucleators, silane coupling agents, and the like are exemplified. In addition, conductivity imparting agents, phosphorous-based peroxide decomposers, pigments, metal inactivators, physical property regulators, and the like are exemplified.

The inorganic filler is not particularly limited as long as it does not deteriorate the optical property, and examples thereof include fine particles such as alumina, aluminum hydroxide, fused silica, crystalline silica, ultra-fine amorphous silica, ultra-fine hydrophobic silica, talc, calcium carbonate, and barium sulfate.

Examples of the organic solvent include aromatic hydrocarbons such as toluene and xylene, aliphatic hydrocarbons such as hexane, heptane, and cyclohexane, and ethers such as petroleum ether, naphtha, tetrahydrofuran, and ethylene glycol dimethyl ether. In addition, ketones such as methyl ethyl ketone and methyl isobutyl ketone and esters such as ethyl acetate and butyl acetate are exemplified.

Examples of the silane coupling agent include β-(3,4-epoxycyclohexyl)ethyltrimethoxysilane, γ-glycidoxypropyltrimethoxysilane, γ-glycidoxypropylmethyldiethoxysilane, γ-glycidoxypropyltriethoxysilane, γ-methacryloxypropylmethyldimethoxysilane, γ-methacryloxypropyltrimethoxysilane, γ-methacryloxypropylmethyldiethoxysilane, γ-methacryloxypropylmethyltriethoxysilane, γ-chloropropyltrimethoxysilane, and γ-mercaptopropyltrimethoxysilane. These can be used alone or as a mixture of two or more thereof.

Examples of a method of using the coating for preventing scattering of fragments include a method of applying the coating for preventing scattering of fragments to a base material of an inorganic material product, and curing the coating for preventing scattering of fragments.

Examples of an applying method include an air spray method, a dipping method, a curtain coater method, a method using a dispenser, a potting method, screen printing, transfer molding, and injection molding.

Specific examples of the applying method include a method of adjusting the coating for preventing scattering of fragments to be in a range of from 30% by mass to 80% by mass and applying the coating for preventing scattering of fragments to an inorganic material product by using air spraying or dip coating.

The coating for preventing scattering of fragments can be cured by heating. The heating temperature is usually 100° C. or higher, for example, is preferably in a range of 120° C. or higher, and more preferably in a range of from 120° C. to 200° C.

When the heating temperature is within the above range, it is considered that the alkoxy oligomer (D) and the organometallic catalyst (E) are more likely to be oriented to the surface of the polysiloxane resin (A), and thus it is possible to improve the surface tackiness of the coating film of the coating for preventing scattering of fragments and to obtain excellent touch feeling and antifouling property.

Examples of a drying method of the coating for preventing scattering of fragments include a method of blowing room temperature air or hot air to a base material of an inorganic material product to which the coating for preventing scattering of fragments is applied, and a method of introducing, in a dryer or a heating furnace, a base material of an inorganic material product to which the coating for preventing scattering of fragments is applied and performing heating.

A coating film to be obtained by curing the coating for preventing scattering of fragments has reduced surface tackiness. That is, the coating for preventing scattering of fragments is formed by a silicone resin that has surface tack-free property.

Such a coating film of the coating for preventing scattering of fragments can be set to have a thickness of from 30 μm to 200 μm. Setting of the thickness of the coating film can be appropriately performed, for example, by adjusting a spraying amount at the time of applying the coating for preventing scattering of fragments. When the thickness of the coating film is within the above range, fragment scattering prevention performance is exerted and long-term adhesion with a base material can be secured.

As compared with the conventional coating for preventing scattering of fragments containing a PFA resin as a main component, the coating for preventing scattering of fragments described above has improved transparency and can be used in a wide range of fields such as window glasses, bulbs (round type and bar type), shades or covers of bulbs, lighting covers of automobiles, ceramic objects, and experimental flask. Further, as compared with the coating for preventing scattering of fragments containing an addition type silicone resin as a main component, the surface tackiness is reduced and the antifouling property is improved, and thus the coating for preventing scattering of fragments described above can be used for an inorganic material product to be installed outdoor over a long time of period.

Hereinafter, examples will be described, but the coating for preventing scattering of fragments of the invention is not limited to examples.

EXAMPLES

Example 1

In 100 parts by mass of KR-165 (produced by Shin-Etsu Chemical Co., Ltd.) as a mixture of polysiloxane resin (A) and polysiloxane cross linking agent (B), 5 parts by mass of chloroplatinic acid catalyst D-165 (produced by Shin-Etsu Chemical Co., Ltd.) as the addition reaction-accelerating catalyst (C), 50 parts by mass of KC-89S (produced by Shin-Etsu Chemical Co., Ltd.) as the alkoxy oligomer (D), and 2 parts by mass of $Zr(acac)_2$ (produced by KANTO CHEMICAL CO., INC.) as the organometallic catalyst (E) were uniformly mixed to prepare the coating for preventing scattering of fragments.

The obtained coating for preventing scattering of fragments was applied to a toughened glass base material, which has been subjected to primer treatment (KBM-403 produced by Shin-Etsu Chemical Co., Ltd.) in advance, using an air spray so as to have a coating film thickness of 100 μm, and cured by performing heating at 150° C. for 30 minutes in a dryer, thereby an evaluation sample was prepared.

Example 2

An evaluation sample was prepared by preparing the coating for preventing scattering of fragments in the same manner as in Example 1, except that 2 parts by mass of zinc octylate (produced by Hope Chemical Co., LTD.) was used as the organometallic catalyst (E) instead of $Zr(acac)_2$.

Example 3

An evaluation sample was prepared by preparing the coating for preventing scattering of fragments in the same manner as in Example 1, except that 2 parts by mass of magnesium octylate (produced by NIHON KAGAKU SANGYO CO., LTD.) was used as the organometallic catalyst (E) instead of $Zr(acac)_2$.

Example 4

An evaluation sample was prepared by preparing the coating for preventing scattering of fragments in the same manner as in Example 1, except that the amount of KC-89S as the alkoxy oligomer (D) was increased from 50 parts by mass to 100 parts by mass and the amount of $Zr(acac)_2$ as the organometallic catalyst (E) was increased from 2 parts by mass to 4 parts by mass.

Example 5

An evaluation sample was prepared by preparing the coating for preventing scattering of fragments in the same manner as in Example 1, except that 50 parts by mass of X-40-9246 (produced by Shin-Etsu Chemical Co., Ltd.) was used as the alkoxy oligomer (D) instead of KC-89S.

Comparative Example 1

An evaluation sample was prepared by preparing the coating for preventing scattering of fragments in the same manner as in Example 1, except that the alkoxy oligomer (D) and the organometallic catalyst (E) were not contained.

Comparative Example 2

An evaluation sample was prepared by preparing the coating for preventing scattering of fragments in the same manner as in Example 1, except that the organometallic catalyst (E) was not contained.

Comparative Example 3

An evaluation sample was prepared by preparing the coating for preventing scattering of fragments in the same manner as in Example 1, except that the alkoxy oligomer (D) was not contained.

Comparative Example 4

An evaluation sample was prepared by preparing the coating for preventing scattering of fragments in the same manner as in Example 1, except that 50 parts by mass of KBM-22 (produced by Shin-Etsu Chemical Co., Ltd.) containing, as a main component, dimethyldimethoxysilane that is one kind of silane compounds was used instead of the alkoxy oligomer (D).

Comparative Example 5

An evaluation sample was prepared by preparing the coating for preventing scattering of fragments in the same manner as in Example 1, except that 2 parts by mass of dibutyltin dilaurate (produced by Tokyo Fine Chemical CO., LTD.) was used as the organometallic catalyst (E) instead of $Zr(acac)_2$.

Comparative Example 6

An evaluation sample was prepared by preparing the coating for preventing scattering of fragments in such a manner that 100 parts by mass of AXC-21 (produced by DAIKIN INDUSTRIES, LTD) as a fluorine resin (PFA resin) was applied to a toughened glass base material, which has been subjected to primer treatment in advance, by electrostatic coating so as to have a coating film thickness of 100 μm, and cured by performing heating at 300° C. for 1 hour in a dryer.

Regarding evaluation samples obtained in Examples and Comparative Examples, fragment scattering prevention performance, transparency, antifouling property, and heat resistance were evaluated. The evaluation criteria are as follows.

<Fragment Scattering Prevention Performance>

A steel punch was applied to the surface of the evaluation sample, then the steel punch was hit by a steel hammer, and the evaluation sample was forcibly self-destructed. The fragment scattering prevention performance was determined according to the following criteria.

○: Glass fragments are not scattered at all.
Δ: Scattering of the glass fragments is 10% by mass or less of the evaluation sample.
x: Scattering of the glass fragments is more than 10% by mass of the evaluation sample.

<Transparency>

As the transparency evaluation, a haze value of the evaluation sample was measured by using a haze meter and transparency was determined according to the following criteria.
○: A case where a haze value is 5% or less is designated as ○.
Δ: A case where a haze value is more than 5% but 10% or less is designated as Δ.
x: A case where a haze value is more than 10% is designated as x.

<Antifouling Property>

As the antifouling property evaluation, the surface of the obtained evaluation sample was touched by a finger and then presence or absence of surface tack was determined according to the following criteria.
○: There is no tack on the surface of the sample and the finger slips on the sample surface.
Δ: There is slightly grip feeling.
x: There is sticky feeling.

<Heat Resistance>

The appearance and the fragment scattering prevention performance after the obtained evaluation sample was retained at 200° C. for 7 months were determined according to the following criteria.
○: The color difference ΔE is 3 or less and, regarding the fragment scattering prevention performance, scattering of the glass fragments is 10% by mass or less of the evaluation sample (including a case where the glass fragments are not scattered).
Δ: The color difference ΔE is 3 or less and, regarding the fragment scattering prevention performance, scattering of the glass fragments is more than 10% by mass of the evaluation sample, or the color difference ΔE is more than 3 and, regarding the fragment scattering prevention performance, scattering of the glass fragments is 10% by mass or less of the evaluation sample (including a case where the glass fragments are not scattered). (not applicable)
x: The color difference ΔE is more than 3 and, regarding the fragment scattering prevention performance, scattering of the glass fragments is more than 10% by mass of the evaluation sample.

The evaluation results are presented in Table 1.

TABLE 1

| | Compound name (product name) | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|
| Mixture of polysiloxane resin (A) and polysiloxane cross linking agent (B) | KR-165 | 100 | 100 | 100 | 100 | 100 | 100 | 100 | 100 | 100 | 100 | |
| Addition reaction-accelerating catalyst (C) | D-165 | 5 | 5 | 5 | 5 | 5 | 5 | 5 | 5 | 5 | 5 | |
| Alkoxy oligomer (D) | KC-89S | 50 | 50 | 50 | 100 | | | 50 | | | 50 | |
| | X-40-9246 | | | | | 50 | | | | | | |
| Dimethoxy-siloxane | KBM-22 | | | | | | | | | 50 | | |
| Organo-metallic catalyst (E) | Zr(acac)$_2$ | 2 | | | 4 | 2 | | | 2 | 2 | | |
| | Zinc octylate | | 2 | | | | | | | | | |
| | Magnesium octylate | | | 2 | | | | | | | | |
| | Dibutyltin dilaurate | | | | | | | | | | 2 | |
| Fluorine resin (PFA resin) | AXC-21 | | | | | | | | | | | 100 |
| Performance evaluation | Fragment scattering prevention performance | ○ | ○ | ○ | ○ | Δ | ○ | ○ | ○ | ○ | x | ○ |
| | Transparency | ○ | ○ | Δ | Δ | ○ | ○ | ○ | Δ | x | x | x |
| | Antifouling property | ○ | ○ | ○ | ○ | ○ | x | x | x | Δ | x | ○ |
| | Heat resistance | ○ | ○ | ○ | ○ | ○ | ○ | x | ○ | ○ | x | ○ |

As presented in Table 1, regarding Examples 1 to 5, it was confirmed that all of the fragment scattering prevention performance, the transparency, the antifouling property, and the heat resistance were favorable. Among these, regarding Examples 1, 2, and 5, it was confirmed that a haze value was 5% or less and thus extremely excellent transparency was exhibited.

However, the fluorine resin (PFA resin) of Comparative Example 6, which has been used as the coating for preventing scattering of fragments conventionally, was favorable in terms of the fragment scattering prevention performance, the antifouling property, and the heat resistance, but did not have sufficient transparency.

From the comparison of Examples 1 to 5 with Comparative Example 1, in the case without both the alkoxy oligomer (D) and the organometallic catalyst (E), it was confirmed that there was sticky feeling on the sample surface and the antifouling property was deteriorated.

From the comparison of Examples 1 to 5 with Comparative Example 2, in the case without the organometallic catalyst (E), it was confirmed that there was sticky feeling on the sample surface and not only the antifouling property but also the heat resistance was deteriorated.

From the comparison of Examples 1 to 5 with Comparative Example 3, in the case without the alkoxy oligomer (D), it was confirmed that the transparency was slightly reduced, there was sticky feeling on the sample surface, and the antifouling property was deteriorated.

From these results, when both the alkoxy oligomer (D) and the organometallic catalyst (E) were contained, it was confirmed that the surface tackiness of the coating for preventing scattering of fragments was reduced and the antifouling property was improved.

Further, from the comparison of Example 1 with Comparative Example 4, in the case of using KBM-22, as one kind of silane coupling agents, containing dimethyldimethoxysilane as a main component instead of the alkoxy oligomer (D), it was confirmed that the transparency of the sample was reduced and there was slightly grip feeling on the sample surface, and thus the antifouling property was deteriorated.

From the comparison of Examples 1 to 3 with Comparative Example 5, in a case where a metal contained in the organometallic catalyst (E) was tin, it was confirmed that none of the fragment scattering prevention performance, the antifouling property, the heat resistance, or the transparency was sufficient.

From the comparison of Examples 1 to 3, in a case where a metal contained in the organometallic catalyst (E) is zirconium and zinc, it was confirmed that excellent transparency was exhibited as compared with magnesium.

From the comparison of Examples 1 and 4, in a case where the amounts of the alkoxy oligomer (D) and the organometallic catalyst (E) were doubled, it was confirmed that the fragment scattering prevention performance, the antifouling property, and the heat resistance were favorable but the transparency was slightly reduced.

From the comparison of Examples 1 to 5 with Comparative Examples 1 to 6, it was confirmed to obtain the coating for preventing scattering of fragments capable of achieving the balance between excellent transparency and antifouling property of the coated surface of the inorganic material product as well as suppressing scattering of fragments of the inorganic material product when the inorganic material product was broken.

INDUSTRIAL APPLICABILITY

The coating for preventing scattering of fragments of the invention is capable of achieving the balance between excellent transparency and antifouling property of the coated surface of the inorganic material product as well as suppressing scattering of fragments of the inorganic material product when the inorganic material product is broken.

The invention claimed is:

1. A coating for preventing scattering of fragments, the coating comprising, as main components, (A) a polysiloxane having at least two vinyl groups or (meth)acryloyl groups each bonded to a silicon atom, (B) a polysiloxane having at least two hydrogen groups each bonded to a silicon atom, (C) an addition reaction-accelerating catalyst, (D) an alkoxy oligomer, and (E) an organometallic catalyst containing at least one metal selected from zirconium, zinc, and magnesium, wherein the alkoxy oligomer (D) is a dimer of a silane compound and is contained in 10 parts by mass to 100 parts by mass with respect to 100 parts by mass of the polysiloxane (A) having at least two vinyl groups or (meth)acryloyl groups each bonded to a silicon atom.

2. A coating product, wherein
the coating for preventing scattering of fragments of claim 1 is formed on a surface of an inorganic material product that otherwise scatters into the fragments when collided with another object or when broken due to self-destruction.

3. The coating product according to claim 2, wherein
the inorganic material product is selected from window glasses, bulbs (round type and bar type), shades or covers of bulbs, lighting covers of automobiles, ceramic objects, and experimental flask.

4. A coating for preventing scattering of fragments, the coating comprising, as main components, (A) a polysiloxane having at least two vinyl groups or (meth)acryloyl groups each bonded to a silicon atom, (B) a polysiloxane having at least two hydrogen groups each bonded to a silicon atom, (C) an addition reaction-accelerating catalyst, (D) an alkoxy oligomer, and (E) an organometallic catalyst containing at least one metal selected from zirconium, zinc, and magnesium, wherein the addition reaction-accelerating catalyst (C) is a hydrocarbon complex, alcoholate, chloride, or at least one simple metal selected from platinum (inclusive of platinum black), rhodium, and palladium, and the organometallic catalyst (E) is a chelate or salt of at least one metal selected from zirconium, zinc, and magnesium, and the alkoxy oligomer (D) is a dimer of a silane compound and is contained in 10 parts by mass to 100 parts by mass with respect to 100 parts by mass of the polysiloxane (A) having at least two vinyl groups or (meth) acryloyl groups each bonded to a silicon atom.

5. A coating product, wherein
the coating for preventing scattering of fragments of claim 4 is formed on a surface of an inorganic material product that otherwise scatters into the fragments when collided with another object or when broken due to self-destruction.

6. The coating product according to claim 5, wherein
the inorganic material product is selected from window glasses, bulbs (round type and bar type), shades or covers of bulbs, lighting covers of automobiles, ceramic objects, and experimental flask.

* * * * *